United States Patent [19]
Blazey et al.

[11] Patent Number: 4,993,811
[45] Date of Patent: Feb. 19, 1991

[54] RIDGE ARRAY LIGHT VALVE DEVICE

[75] Inventors: Richard N. Blazey, Penfield; Joseph Y. Kaukeinen, Rochester, both of N.Y.

[73] Assignee: Eastman Kodak Company, Rochester, N.Y.

[21] Appl. No.: 281,420

[22] Filed: Dec. 8, 1988

[51] Int. Cl.$^5$ .................................. G02F 1/03
[52] U.S. Cl. .................... 350/392; 350/389; 350/356
[58] Field of Search ........... 350/384, 388, 389, 392, 350/393, 356

[56] References Cited

U.S. PATENT DOCUMENTS

| | | | |
|---|---|---|---|
| 4,406,521 | 9/1983 | Mu et al. | 350/392 |
| 4,491,393 | 1/1985 | Roelants | 350/392 |
| 4,707,081 | 11/1987 | Mu | 350/388 |
| 4,765,721 | 8/1988 | Agostinelli et al. | 350/389 |
| 4,802,741 | 2/1989 | Kaukeinen | 350/392 |

Primary Examiner—Bruce Y. Arnold
Assistant Examiner—David R. Parsons
Attorney, Agent, or Firm—John D. Husser

[57] ABSTRACT

An improved electro-optic modulator for a light valve device of the kind wherein the modulator is sandwiched between cross polarizer elements. The modulator includes a ferroelectric ceramic panel having a plurality of parallel grooves forming intervening parallel walled ridge portions. A series of address and reference electrode pairs are formed on the ridge side walls with each electrode pair being substantially parallel and opposingly centered on a normal across the intervening ridge portion. The electrode pairs of the series are staggered in location along respective ridge portions to define an array having a linear direction at about 45° to the direction of the panel grooves. The panel can be oriented between the polarizer elements with the polarization directions of the elements parallel to and perpendicular to the linear direction of the array.

5 Claims, 4 Drawing Sheets

RIDGE ARRAY LIGHT VALVE DEVICE

FIELD OF INVENTION

The present invention relates to light valve devices of the kind having an electroded modulator panel, formed of ferro electric ceramic material and sandwiched between crossed Polarizers to oPerate in a quadratic Kerr cell mode, and more sPecifically to improved panel configurations for such devices

BACKGROUND ART

In prior art light valve devices of the kind noted above, the light modulator panels (e.g. formed of PLZT materials) have been fabricated to have a series of selectively addressable electrode pairs that are spaced along a linear direction to form an array of discrete light modulator pixel portions. When a particular electrode pair is addressed to form an electric field across the intervening panel portion, the light, which is polarized in a first direction is shifted in polarization direction by that panel portion. A second output polarizer (analyzer) that is oriented 90° to the input polarization direction, will therefore pass light, so modulated by field activated panel portions, and block light that is not so modulated. To obtain maximum modulation effect (and therefore good contrast) for such light valves, it is desirable that the direction of the modulator field be normal to the input light beam and at 45° to the input light polarization direction. The downstream polarizer (i.e. analyzer) is oriented at 90° to the input light polarization direction.

Electrodes have been fabricated on such modulator panels as surface configurations (see U.S. Pat. No. 4,406,521) and as in depth configurations (see U.S. Pat. No. 4,707,081 and the prior art teachings described therein). The in depth electrode approach is generally preferred because it enables a uniform electric field to be effective, in a normal direction to the passing light beam, throughout a large portion of the light passage distance through the modulator panel thickness another fabrication method, to achieve in depth electrode modulator panels, is described in U.S. patent application Ser. No. 107,230 filed Oct. 9, 1987.

U.S. Pat. No. 4,765,721 discloses a light valve array construction which is less subject to stress induced light leakage This patent teaches that it is desirable to align the array direction of a light valve device so that the linear direction of its array of modulator elements is parallel and perpendicular, respectively, to the polarization directions of the sandwiching polarizers. This substantially reduces stress induced light leakage through the array element, which can be caused by thermal or mechanical stress of the modulator panel. The electric field of the '721 patent device is provided at 45° to the direction of input light polarization by forming electrodes pairs on the surface of the modulator panel at 45° to the linear direction of the array. The improvements obtained by the '721 patent approach are quite advantageous, and it would be desirable to attain its advantages in an in depth electrode construction. However, we have found that if electrodes are disposed on a 45° centerline across the width of the ridge in an in ,depth electrode configuration, the resulting electric field is not uniformly operative at 45° to the length of the ridge, and, more specifically, not uniformly at 45° to the input light polarization direction.

SUMMARY OF THE INVENTION

Thus, one important purpose of the present invention is to provide an improved light valve modulator configurations wherein an effective in depth electrode field can be used to address individual pixel portions of the modulator panel, wherein the light leakage incident to thermal/mechanical stress can be obviated and wherein the operative electric field for modulation is uniformly about 45° to the input light polarization direction. Light valve devices constructed in accord with the present invention provide the advantages of uniformly high contrast and lower activating fields, which results in increased device longevity.

In one embodiment the invention constitutes, an improved modulator panel construction for a light valve device of the kind wherein an electroded ferro electric modulator is sandwiched between crossed polarizer elements. The improved modulator panel has a plurality of parallel grooves forming a plurality of parallel walled ridge portions therebetween, and a series of address and reference electrode pairs, each pair being substantially parallel to each other and oppositely centered on a normal across the intervening ridge portion. The electrode pairs of the series are staggered in location along their respective ridge portions to define a linear array having a linear direction at about 45° to the direction of the grooves. The panel can be oriented between the polarizer elements with the polarization directions of the elements parallel to and perpendicular to the linear direction of the linear array.

BRIEF DESCRIPTION OF THE DRAWINGS

The subsequent detailed description of the preferred embodiments refers to the accompanying drawings wherein.

DETAILED DESCRIPTION OF PREFERRED EMBODIMENTS

Figure 1:
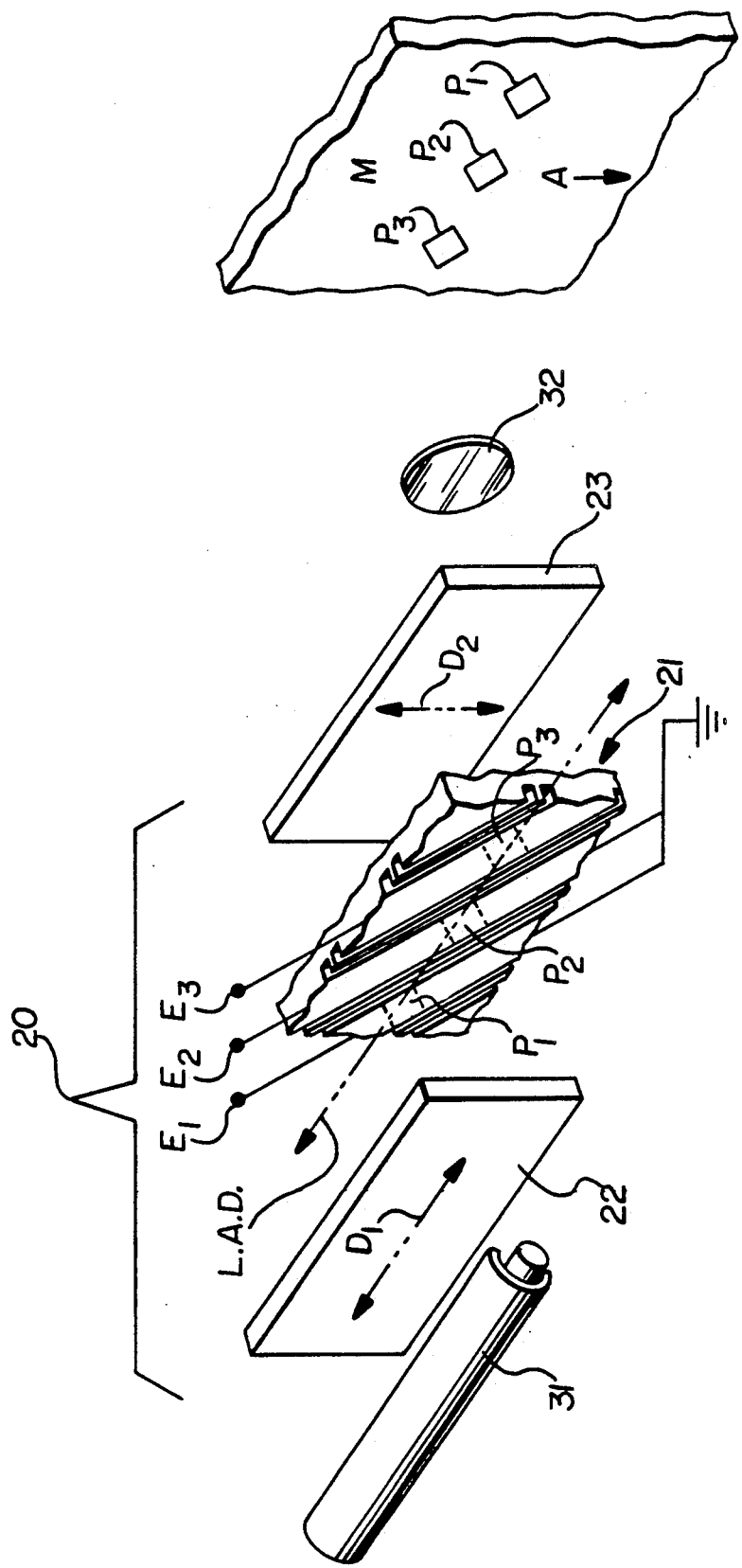
FIG. 1 is a perspective view of an electronic imaging system showing schematically one embodiment of a light valve device in accord with the present invention.

FIG. 1 illustrates schematically one electronic imaging system employing a light valve device 20 in accord with the present invention. In general, the imaging system includes an exposure light source 31 which directs light through the device 20 to a lens system, indicated schematically as 32. The lens system focuses the light pattern controlled by device 20 onto a print medium M, e.g. a photosensitive imaging material such as photographic film.

The light valve device 20 shown in FIG. 1, in general, comprises an electroded modulator panel 21 sandwiched between crossed polarizer elements 22, 23. The modulator panel can be formed of ferro electric ceramic material, e.g. lanthanum substituted lead titanite zirconate (PLZT). As shown in FIG. 1, and in more detail in FIGS. 2, 3a and 3b, the modulator panel is diced by sawing to form a plurality of parallel, rectangular ridge modulator portions R and bus land portions B, having parallel sides and top lands, located between the plurality of parallel grooves G. In accord with the present invention the panel 21 is predeterminedly electroded on the side walls of ridge portions R to form a plurality of selectively addressable pixel portions $P_1$, $P_2$, $P_3$..... Thus, the electrodes on one side wall of each pixel portion are coupled, via deposited conductive leads formed in grooves G and on bus land portions B, to selectively activatible electrical energy sources $E_1$, $E_2$, $E_3$.... The electrodes on the other side wall of each pixel portion are similarly coupled to a common reference potential, e.g. ground, at pad locations denoted Gd. Also, it will be noted that in accord with the present invention, the pixel portions are predeterminedly located by the electrode construction to form a linear array along the linear array direction denoted L. A. D. As shown in FIG. 1, the panel 21is oriented relative to the polarizers 22, 23 so that the linear array direction L. A. D. is parallel and perpendicular respectively to the polarization direction of polarizers 22, 23.

Figure 2:
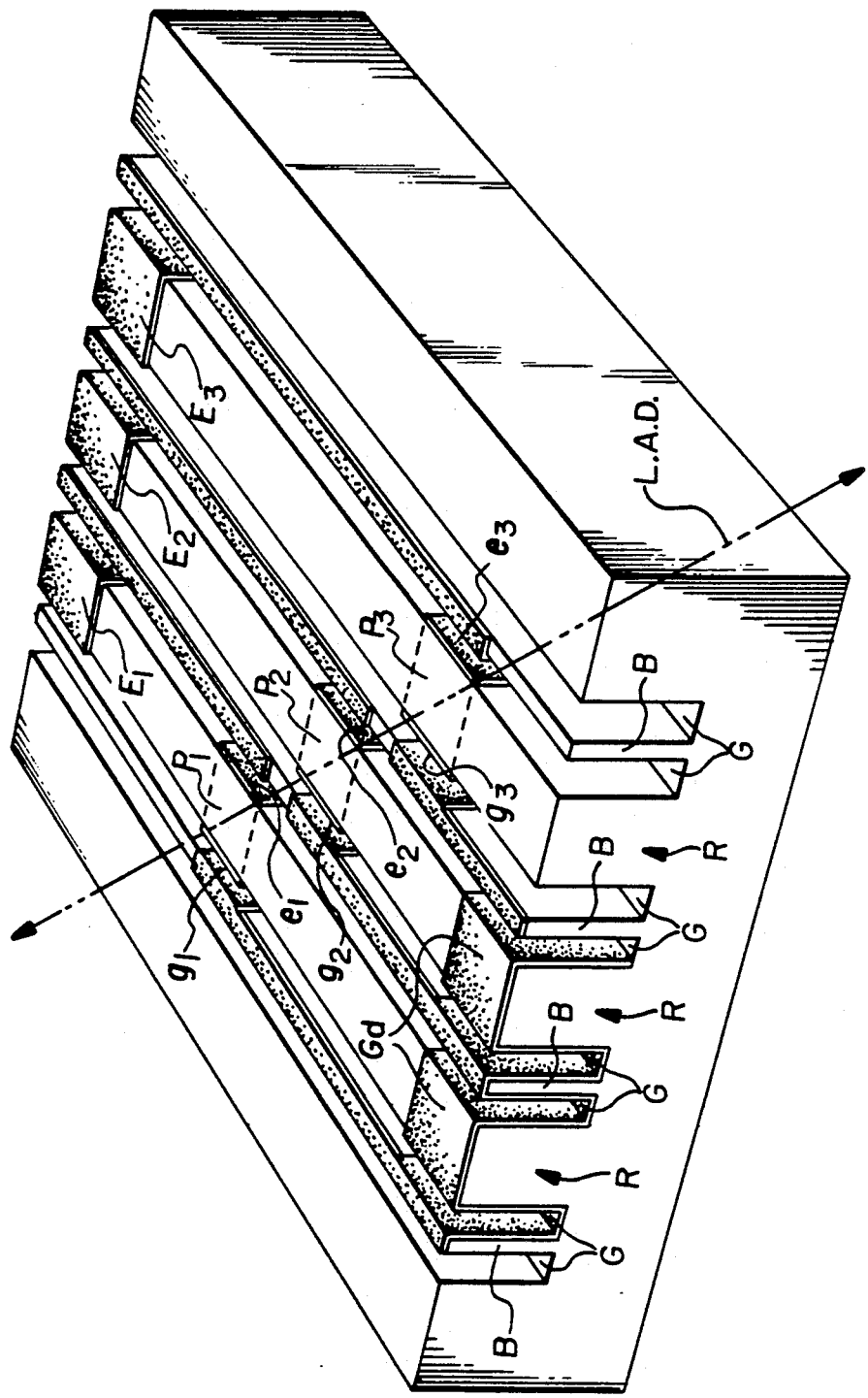
FIG. 2 is a perspective view showing in more detail one electroded modulator panel such as can be used, in accord with the present invention, in the light valve device of the FIG. 1 system.
Figures 3A, 3B:
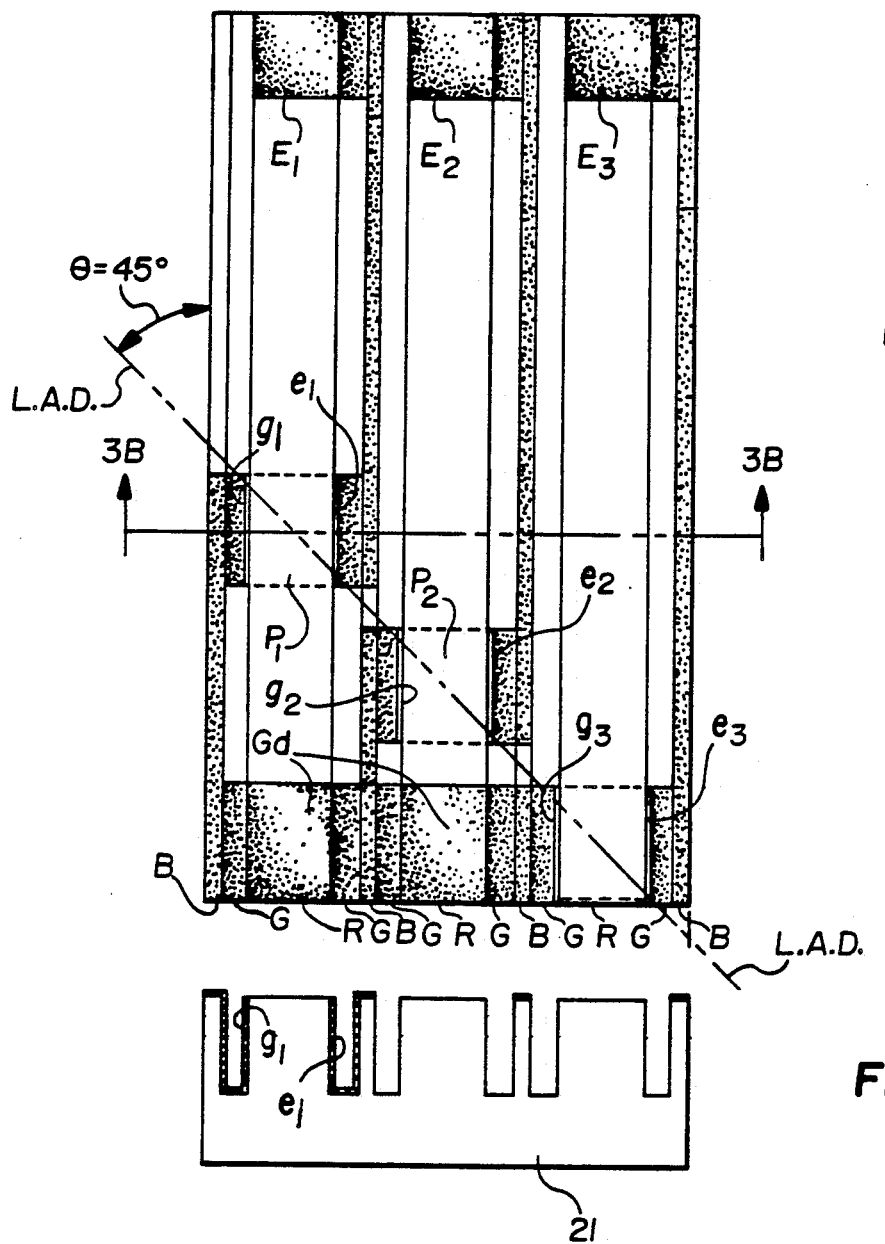
FIGS. 3a and 3b are respectively top and cross sectional views of the FIG. 2 panel.

Referring specifically to FIGS. 2, 3a and 3b, the predetermined electrode configuration of the grooved panel 21 can be seen in more detail. Thus, it can be seen that pixel portions $P_1$, is defined between address electrode surface $e_1$, and reference electrode surface $g_1$, and that the pair of surfaces $e_1$, $g_1$, are parallel to each other and to the parallel side walls of the ridge R therebetween. Also, an important aspect of the invention is that the surfaces $e_1$, $g_1$ substantially are centered to one another on a line perpendicular to the land side walls. Such construction causes an electrical field, applied between electrodes $e_1$, $g_1$, to be uniform in a direction across the width the pixel $P_1$ panel material therebetween, as well as extending uniformly in the depth of the pixel material.

As shown in FIGS. 3a and 3b, the address and reference electrode pairs $e_2$, $g_2$ and $e_3$, $g_3$ are constructed with the same opposingly centered relation described above with respect to pair $e_1$, $g_1$. However, it can be seen that the different electrode pairs are located in a staggered relation, with respect to the longitudinal dimension of the ridges in the panel 21. More specifically, the electrode pairs are staggered in a predetermined manner such that pixel portions $P_1$, $P_2$, $P_3$..., defined therebetween, lie along a linear array direction L. A. D. that is at approximately 45° to the longitudinal dimensions of the ridges (i.e. groove/ridge direction).

As noted above, the preferred method for constructing the grooved panel is by dicing. The address and reference electrode pairs, and their lead structure (indicated by stippling in FIG. 3a ) to energy sources $E_1$, $E_2$, $E_3$ and to ground, are preferably formed by photofabrication and vapor deposition through a stencil. Preferred details for these fabrication procedures are described in U.S. application Ser. No. 107,230, filed Oct. 9, 1987, and entitled "In Depth Electrode Light Valve Array Devices and Improved Fabrication Method ThereFor", now U.S. Pat. No. 4,802,741. The disclosure of that U.S. application is incorporated herein by reference for its detailed teachings of those fabrication techniques.

The physical mechanisms whereby light valve devices, constructed as described above, provide enhance performance can be understood further by a description of the operation of the illustrative FIG. 1 system. In one mode, the record medium M is advanced in the direction of arrow A, the light source 31 is continuously "on" and the light valve device is activated by information signals to selectively pass light to pixels on the print medium (e.g., $P_1'$, $P_2'$, $P_3'$ ... as lines of the medium move past a linear exposure zone. That is, when the address electrode of a pixel portion pairs is coupled to an energy potential, an electric field is created across the intervening modulator portion toward the reference (ground) potential electrode of the pair. This causes the light passing through the intervening modulator portion (from top to bottom as viewed in FIG. 2) to be rotated in polarization. The desired rotation for an "on" condition is 90° so that light rotated will pass analyzer 23. This will be achieved when the field strength is adequate and light of the proper intensity light level will then pass to the record medium M. The in depth electrode structure provided in accord with one aspect of the present invention allows proper light modulation at lower field levels than surface electrode configurations.

Figure 4A:
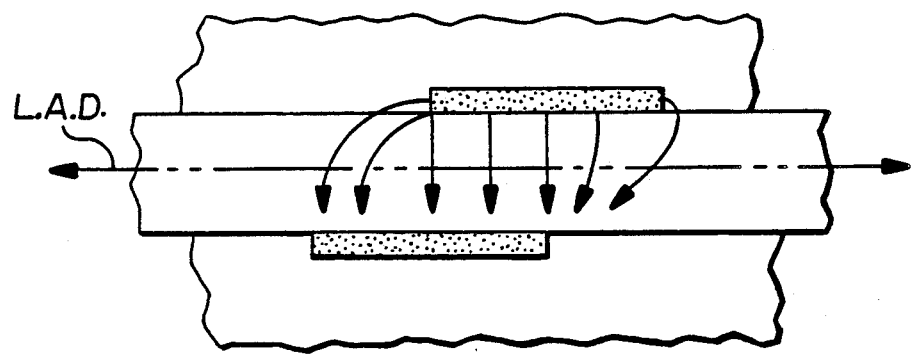
FIGS. 4a and 4b are schematic diagrams illustrating the field directions through pixel portions of light valve modulators.
Figure 4B:
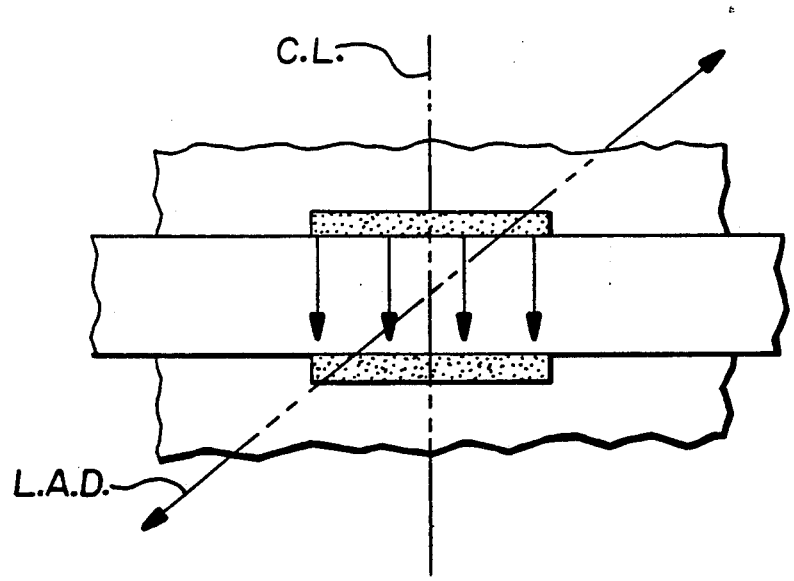

It is also important that the electrical field be at 45° to the polarization directions of input polarizer and analyzer. For example, FIG. 4a shows schematically how the electric field direction can vary in a direction within portions of the bulk of an operative modulator, with electrode pairs that are offset (e.g. 45°) with respect to the longitudinal direction of a single ridge array, i.e. one having an L. A. D. as indicated in FIG. 4a. In contrast, it can be noted that in FIG. 4b, where the electrodes are constructed, in accord with the invention, the electrodes of the pair are centered on a center-line C. L. that is normal to the longitudinal direction of the ridge and thus its sidewalls. As illustrated in FIG. 4b and in accord with the present invention, the electric field within the modulator is then uniformly directed at 45° to L. A. D. throughout the operative modulation portion of the ridge, as well as being uniform throughout the depth of the ridge.

Referring again to FIG. 1, it can be seen that, in accord with the present invention, the staggered relation of electrode pairs along the ridges of panel 21 creates the linear array direction L. A. D. Also it can be seen that the modulator panel is located between the polarizers so that the L. A. D. of the panel is respectively parallel and perpendicular to polarizers 22, 23. Thus, according to the present invention light leakage (due to stress induced birefringence) will not occur along the line of the array and will not reduce the system contrast.

Considering all of the foregoing it will be appreciated that the modulator panel and electrodes construction in accord with the present invention and their orientation (vis a vis the polarizers) cooperate to achieve the advantages of an in depth electric field, uniformly at 45° to the polarizer directions throughout the modulator pixel portion, while still providing an L. A. D. construction that can avoid light leakage. This in turn provides good contrast imaging at lowered operating voltages.

The invention has been described in detail with particular reference to certain preferred embodiments thereof, but it will be understood that variations and modifications can be effected within the spirit and scope of the invention.

We claim:

1. In a light valve device of the kind having an electroded, ferro-electric modulator panel sandwiched between crossed polarizer elements, the improvement wherein:

(a) said panel comprises: (i) a plurality of parallel grooves that form a plurality of parallel walled ridge portions therebetween and (ii) planar address and reference electrode pairs on opposing wall surfaces of said ridge portions, the electrodes of each pair being substantially parallel and opposingly centered on a normal across the intervening ridge portion, said electrode pairs being staggered in location in the groove length direction along their respective ridge portions so as to form a linear array having a linear array direction at about 45° to the longitudinal dimensions of said ridges and grooves; and (b) said panel is oriented between said polarizer elements so that the polarization directions of said elements are respectively parallel and perpendicular to said linear array direction.

2. An improved electro optic modulator for use in a light valve device of the kind wherein the modulator is sandwiched between crossed polarizer elements, said modulator comprising a panel of ferroelectric ceramic material having: (i) a plurality of parallel groove portions with a plurality of parallel walled ridge portions respectively therebetween and (ii) a series of address and reference electrode pairs, the electrodes of each pair being substantially parallel and opposingly centered to each other on a normal to the length direction of the intervening ridge portion, said electrode pairs of said series being staggered in location along their respective ridge portions to define a linear array having a linear direction at about 45° to the length direction of said grooves.

3. In a light valve device of the kind having an electroded, ferro electric modulator panel sandwiched between crossed polarizer elements, the improvement wherein:

(a) said panel comprises a plurality of spaced parallel walled ridge portions and with a plurality of planar address and reference electrode pairs respectively on opposing wall surfaces of said ridge portions;

(b) said electrodes of each of said pairs are substantially parallel and opposingly centered on a normal to the walls of their intervening ridge portion;

(c) said electrode pairs are staggered in location in the ridge length direction along lengths of their respective ridge portions so as to form a linear array having a linear array direction at about 45° to the longitudinal dimensions of said ridges; and (d) said panel is oriented between said polarizer elements so that the polarization directions of said elements are respectively parallel and perpendicular to said linear array direction.

4. An improved electro optic modulator for use in a light valve device of the kind wherein the modulator is sandwiched between crossed polarizer elements, said modulator comprising a panel of ferroelectric ceramic material having a plurality of spaced, parallel walled ridge portions and a series of address and reference electrode pairs, the electrodes of each pair being substantially parallel and opposingly centered to on another on a normal to the walls of the intervening ridge portion, the electrode pairs of said series being staggered in location in the ridge length direction along their respective ridge portions so that their intervening modulator pixels define a linear array direction at about 45° to the direction of ridge portion walls.

5. In a light valve device of the kind having an electroded, ferro electric modulator panel sandwiched between crossed polarizer elements, the improvement wherein:

(a) said panel comprises a plurality of spaced parallel walled ridge portions and with a plurality of planar address and reference electrode pairs respectively on opposing wall surfaces of said ridge portions;

(b) said electrodes of each of said pairs are substantially parallel and opposingly centered on a normal across their intervening ridge portion; and (c) said electrode pairs are staggered in location in the ridge length direction along their respective ridge portions so as to form a linear array having a linear array direction at about 45° to the longitudinal dimensions of said ridges.

* * * * *